United States Patent [19]

Rubin

[11] 4,172,226

[45] Oct. 23, 1979

[54] REMOTE RADIATION DETECTION SYSTEM

[76] Inventor: Saul Rubin, 118 Fairholme Ave., Toronto, Ontario, Canada, M6B 2W9

[21] Appl. No.: 782,391

[22] Filed: Mar. 29, 1977

[51] Int. Cl.² .................. G03C 9/00; G01T 1/20; G01T 1/18

[52] U.S. Cl. .................. 250/312; 250/362; 250/366; 250/385

[58] Field of Search .......... 250/312, 336, 363 S, 250/361 R, 366, 367, 374, 388, 385

[56] References Cited

U.S. PATENT DOCUMENTS

| | | | |
|---|---|---|---|
| 2,351,845 | 6/1944 | Stever | 250/388 |
| 3,011,057 | 11/1961 | Anger | 250/363 S |
| 3,436,539 | 4/1969 | Wilcox | 250/366 |
| 3,562,528 | 2/1971 | Joyce | 250/366 |
| 4,005,292 | 1/1977 | Oesterlin | 250/366 |
| 4,037,105 | 7/1977 | Lauer | 250/367 |

Primary Examiner—Alfred E. Smith
Assistant Examiner—Janice A. Howell

[57] ABSTRACT

An apparatus and method are disclosed to remotely determine the location of an unknown nuclear radiation source or locations of unknown nuclear radiation sources which may even be shielded from the detection apparatus by known obstructions. The apparatus uses fixed position omnidirectional radiation intensity responsive detectors arranged in known geometry. Signals are provided from the detectors to a signal acquisition and computer system which monitors the detector outputs. The method is based on finding the ratios of the field intensities between the detectors due to each radiation source. A set of equations based on these ratios is used to locate and size a source or a set of algorithms is used to separate the signals into the component parts for each source and to determine the source locations and source sizes.

55 Claims, 13 Drawing Figures

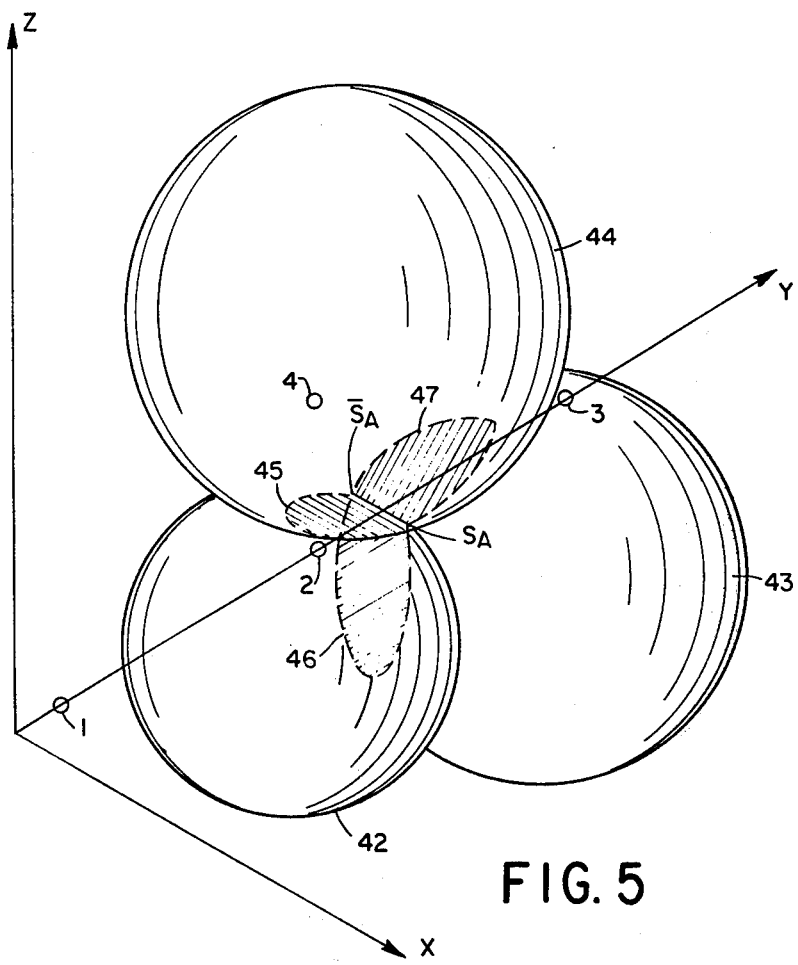
FIG. 5
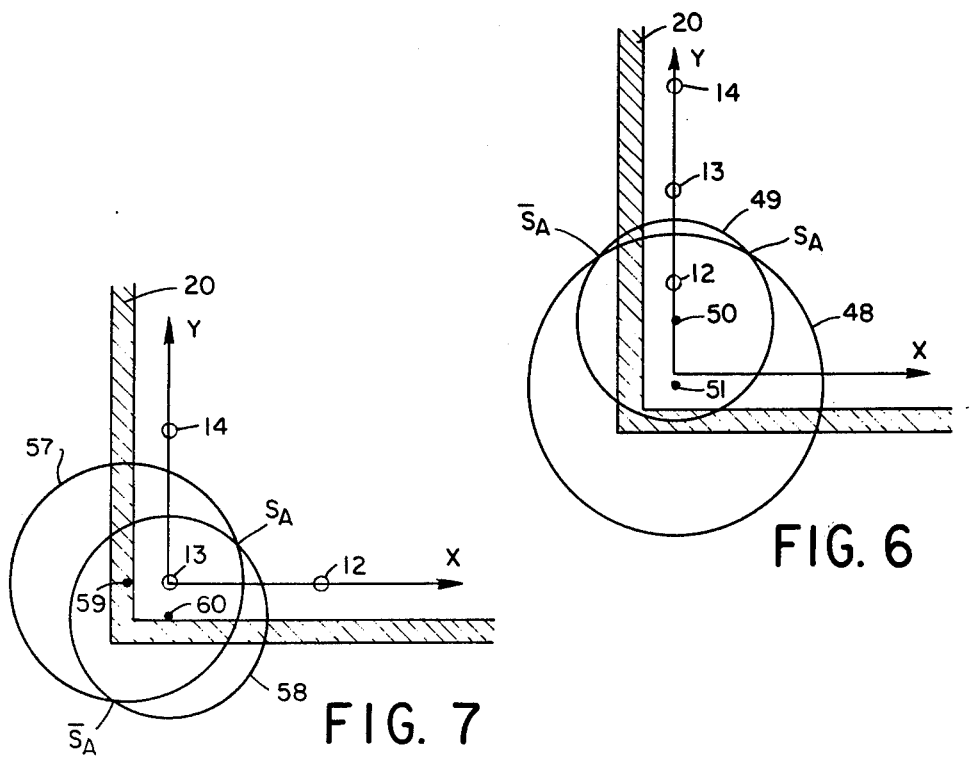
FIG. 6
FIG. 7

REMOTE RADIATION DETECTION SYSTEM

BACKGROUND OF THE INVENTION

This invention is concerned with the location of radiation sources which are generally known as direction finding systems. The invention is a remote radiation detection system which employs fixed omnidirectional radiation responsive means and relies on measuring the intensity of the received radiation to determine the location and size of radiation sources. This invention is of particular interest for nuclear radiation but is not restricted thereto.

Direction finding systems are known which use different types of radiation and are employed in many applications. Direction finding systems are used to locate any object or source of radiation which is of particular interest. One of the most common applications is in navigation to determine the location of a moving vehicle such as an airplane. Other applications of direction finding are in surveying, astronomy, geology, and medicine.

In navigation systems, many methods have been devised which use directional antennas for direction finding. Time referencing of a signal by measuring the elapsed time interval or phase change are other methods used in navigation systems for direction finding. Similar techniques also exist in applications such as surveying, astronomy, seismic measurements and geological exploration. Generally, these systems are designed to operate at a particular frequency or band of frequencies rather than to operate with an inherently noisy signal whose intensity is the major characteristic. They also become more complex when the detectors have directivity and the detectors must be moved or rotated to scan the field.

In the prior art, nuclear radiation detectors are given directivity by mounting a shield with a window around the detector. Directivity is obtained when the shield is rotated. The addition of a similar detector with a shield rotated about a parallel axis also provides directivity. By triangulation, the source location in two dimensions is determined. To determine the source location in three dimensions, a third detector is required with a shield rotated about a non-parallel axis.

Detectors for nuclear radiation have also been developed with special designs to give them directional characteristics without the use of shielding so that the system is light in weight. The detector is then rotated to provide directivity.

Another light weight detection system of the prior art is to use two detectors on a common mounting separated by some radiation shielding material. When the detectors are rotated so that both face the source, the difference of the two detectors produces a minimum or null signal which gives the direction of the source. In another method, two detectors on a single mounting are used and a radiation shield is placed directly in front of one detector. When the detectors are rotated so that both face the source, a maximum signal is produced from the difference signal of the two detectors.

In the above methods of the prior art, only the radiation intensity of the source is measured. However, in order to obtain directivity, means must be provided to rotate the detector assembly. Location of a source in two dimensions requires two rotating detector assemblies and location of a source in three dimensions requires three rotating detector assemblies.

As will be appreciated by those skilled in the art, it is desirable in nuclear radiation detection systems to have detectors which can be placed in a fixed position instead of being moved about or rotated when operating. When a detector is in a fixed position, the complexity is reduced and the reliability is increased.

SUMMARY OF THE INVENTION

Nuclear radiation detectors such as ionization chambers, Geiger-Mueller or G-M tubes and scintillation detectors normally do not have any directivity, i.e., they are responsive to nuclear radiation from any direction. The present invention utilizes this property. In its basic form, four fixed position omnidirectional (four pi) radiation detectors are employed to find the location in three dimensions of the radiation sources. The intensity of radiation received by the radiation detectors produces signals which are then used to determine the source location or locations. This is done by using the ratios of these signals and the known location of the radiation detectors to determine the real source location.

In a preferred embodiment of the invention, the radiation detectors are employed to detect gamma radiation. Radiation detectors to detect neutron radiation can be similarly employed. In addition, the invention is not limited to nuclear radiation but may be applied to all types of electromagnetic radiation such as radio waves, infra red and light, to seismic radiation and also to sound radiation. In order to use this invention, it is necessary that the response at each detector can be expressed as $I = Gf(d)$ where I is the intensity of radiation at the detector, f(d) is the function which defines the signal intensity change with distance and G is a conversion constant common to all detectors. Under ideal conditions, the inverse square law applies for nuclear radiation and is used for the present invention. Under less ideal conditions or in other applications, a different transmission function may exist. However, if the relationship of radiation intensity to distance is the same for each detector, then the same principle of the invention may apply.

In many situations, it is possible for a great number of sources to exist at one time and a source can be identified at a particular energy or frequency. This invention can be used to locate a source at a particular frequency in the same manner which applies for a noisy or broad band signal. The detectors in this case would be energy sensitive. This modification may be used as a convenient way to locate a source when many sources exist.

An important application for direction finding, which is the object of this invention is in the detection of nuclear radiation to determine the location of a radiation source and its size. (The term "source size" or equivalent in the context of this specification refers to the size of the activity of a radioactive source rather than its physical dimensions.) This invention can be applied when a radioactive source has developed, for example, from a leak. This knowledge is useful in reactor operations and can be a means to limit contamination and the consequent health hazard. The invention can also be used to determine the location and size of a radioactive source when geological exploration is being done. In another application, the invention can also be used to determine the location of a radioactive tracer for medical diagnostic purposes. A further application is to determine the location of a radioactive source as part of a tracking and guidance system. Another application involves the use of a known radioactive source in conjunction with the detector system of this invention for the location of a scattering medium such as might be caused by irregularities in a homogeneous material, e.g., a cavity or crack in a metal casting.

When a radioactive source exists, it is usually not an unobstructed isolated isotropic point source with a single energy. In locating a source and determining its size, many considerations arise due to such things as the type of radiation e.g. gamma, beta, etc., radiation energy, geometry of the source, multiple sources, attenuation by obstructions as well as the transmitting medium, variations in attenuation with energy, decay changes, background radiation, measurement errors and others. These involve complex measurements so that normally only approximate solutions are possible with the available data. Various problems encountered due to multiple sources, attenuation, measurement errors and background radiation are considered so that source location and size can be determined remotely using fixed position omnidirectional detectors. The detector outputs are monitored continuously by a computer which has been programmed to determine the location of the source (or sources) and size (or sizes) as it appears. Because the monitoring is done on a continuous basis, changes for all sources are updated at regular intervals.

It is an object of this invention to provide a direction finding system to locate and size a radiation source using fixed position omnidirectional detectors.

A further object of this invention is to provide a direction finding system to locate and size multiple radiation sources using fixed position omnidirectional detectors.

A further object of this invention is to provide a direction finding system which employs detectors that need respond only to the relative intensity of radiation at the detectors in order to locate and size a radiation source. In addition to being intensity responsive, the detectors can be made energy responsive in some applications in order to improve the selectivity and sensitivity for a particular source.

Another object of this invention is to provide a direction finding system to locate and size multiple radiation sources using fixed position omnidirectional detectors together with a directional detector. This arrangement reduces the number of detectors required and can sometimes provide an improved source locating geometry as compared to a system using all omnidirectional detectors.

It is a further object of this invention to provide a direction finding system which has the means to locate and size radiation sources when the source sizes change simultaneously.

It is a further object of this invention to provide a direction finding system which has the means to locate and size radiation sources when an obstruction exists which shields the source from one or more of the detectors.

It is a further object of this invention to provide a direction finding system which has the means to continuously monitor the change in size of radiation sources and update these results at regular intervals as they occur.

It is a further object of this invention to provide a direction finding system which has the means to locate and size radiation sources in a number of separate areas by sequentially sampling the sets of detectors in each of these separate areas.

The invention as herein described is for a nuclear radiation area monitoring system. The function of this system is to measure the strength of the field (R/hr.) for a particular area to determine man-rem exposure. The radiation usually detected in area monitoring from fission and activation products and other nuclear reactions is wide range gamma radiation. This radiation can be characterized by the high fields and relatively low attenuation in air. Single non-directional detectors such as scintillation detectors, G-M tubes or ionization chambers are commonly used to determine the local radiation field. If the location of the source is not known, the field at any other location is not known and cannot be determined except by a direct local measurement. An exception is when there are no local sources and a uniform background radiation exists. Because the source locations are not known, limitations are imposed on the operating staff's ability to predict or determine the source size and radiation dose exposure when new radiation hazards arise.

Preferred embodiments of the invention are described in the following specification in accordance with the accompanying drawings from which the features, objects and advantages can be more fully appreciated and the scope of the invention is defined by the appended claims.

BRIEF DESCRIPTION OF THE DRAWINGS

FIG. 5 is an isometric view illustrating the principle of operation of the present invention as applied to FIG. 1 for a three dimensional space.

FIG. 6 is a plan view illustrating the principle of operation of the present invention as applied to FIG. 2 for a two dimensional space.

FIG. 7 is a plan view illustrating the principle of operation of the present invention similar to FIG. 2 for a two dimensional space. However, the geometry of the detector locations forms a right angle rather than a straight line.

DETAILED DESCRIPTION OF THE INVENTION

The basic concept of this invention depends on the fact that the relationship between the strength of a point isotropic source and the field intensity at a distance is inversely proportional to the square of the distance. With distances that are short enough so that linear absorption due to air can be neglected, the relationship $I=kSe^{-ud}/d^2$ can be reduced to $I=kS/d^2$ where:

I is the field intensity, (R/hr.),
S is the source activity, (Ci.),
d is the distance from the source to detector, (m),
k is the conversion factor determined by the detector and the energy of the radiation emitted by the source,
u is the linear absorption coefficient of air $(m^{-1})$.

Figure 1:
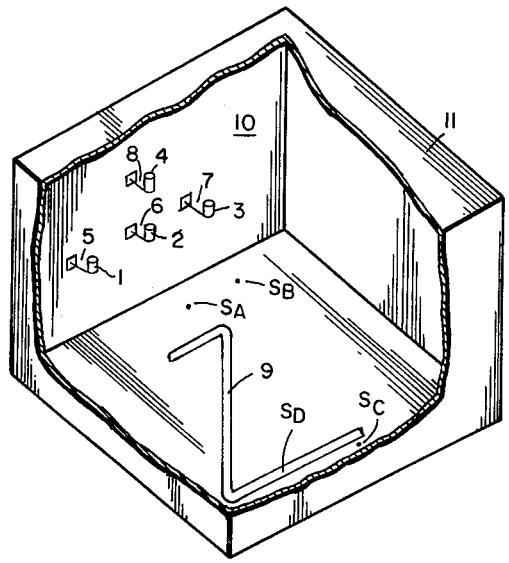
FIG. 1 is an isometric view illustrating a mounting arrangement of four omnidirectional detectors.

In FIG. 1 which is a preferred arrangement of the invention, four identical detectors 1, 2, 3 and 4 are mounted on a vertical wall 10 by supports 5, 6, 7 and 8 which are of equal length, so that detectors 1, 2, 3 and 4 lie in a vertical plane. The detectors, 1, 2, 3 and 4 are arranged in a non-linear pattern, i.e., detectors 1, 2 and 3 are in line and detector 4 is offset. For illustrative purposes, a number of radioactive sources $S_A$, $S_B$, $S_C$ and $S_D$ are shown in the room area 11 which is being monitored and item 9 is an obstruction, e.g., a pipe. The principle of the invention is described here with respect to source $S_A$, but applies to other sources as well.

$S_A$ is remote from the detectors 1, 2, 3 and 4 and its location can be given in general by x, y, and z in rectangular co-ordinates. The field intensities measured by detectors 1, 2, 3 and 4 are $I_1$, $I_2$, $I_3$ and $I_4$ over distances $d_1$, $d_2$, $d_3$, and $d_4$ respectively where $d_1=(x_1^2+y_1^2+z_1^2)^{\frac{1}{2}}$, etc. By selecting detectors 1 and 2, there exists a locus of possible source locations defined by $I_1$ and $I_2$ for source $S_A$ which is a sphere, i.e., the ratio, $I_1/I_2$ equals a constant, defines a sphere. This can be determined from the solution of the equations $I_1=kS/d_1^2$ and $I_2=kS/d_2^2$ for $d_1$ and $d_2$.

In FIG. 5, an isometric view is shown of three intersecting spheres 42, 43, and 44 which are the loci generated by detectors 1, 2, 3 and 4 according to the principle of the invention. In particular, sphere 42 is the locus generated by detectors 1 and 2, and source $S_A$ as described in the paragraph above according to the principle of the invention.

By the selection of another pair of detectors, say 1 and 3, another similar sphere 43 of possible source locations is determined for $I_1$ and $I_3$. It can be shown that spheres 42 and 43 intersect and the locus of this intersection is a circle 46. In order to uniquely determine the source location, $I_1$ and $I_4$ are used to determine a third locus of possible source locations, sphere 44. Sphere 44 intersects with each of the spheres 42 and 43 and the loci of the three spheres can be shown to have two triple point intersections. One is the location of source $S_A$ and the other is the location of an imaginary source $\overline{S}_A$.

With regard to the spherical loci which are generated by the selection of pairs of detectors, a unique situation exists when the source is equidistant from the two selected detectors. For such a case, the radius of the sphere is infinite and the locus is a plane surface which cuts orthogonally at the centre of the line joining the two selected detectors.

By means of a suitable location for detectors 1, 2, 3 and 4, it is possible to ensure that one intersection is outside the coverage area. Therefore, the source will be known to be at the other intersection. All the detectors are along a wall but removed so that background scatter from the wall can be neglected. With all the detectors mounted near the wall of the monitored area, one intersection at $\overline{S}_A$ will be on the side of the wall which is usually outside the coverage area. The other intersection at $S_A$ is in the coverage area and is the real source location. In practice, the detectors 1, 2, 3 and 4 are located several feet from the wall to lessen background scatter effects. These detectors are arranged on a vertical plane because the expected direction of observation is at right angles to this plane, i.e., the source and detector are separated on a horizontal plane, more or less.

The use of four detectors distributed on a plane provides the information to get the exact location for a source. This obvioiuslly requires a solution in three dimensions. However, because of the nature of the radiation problem and the physical geometry of the areas often encountered, a valid and simplifying method can be obtained by use of a plane space (two dimensions). With this method, only three detectors are required.

Figure 2:
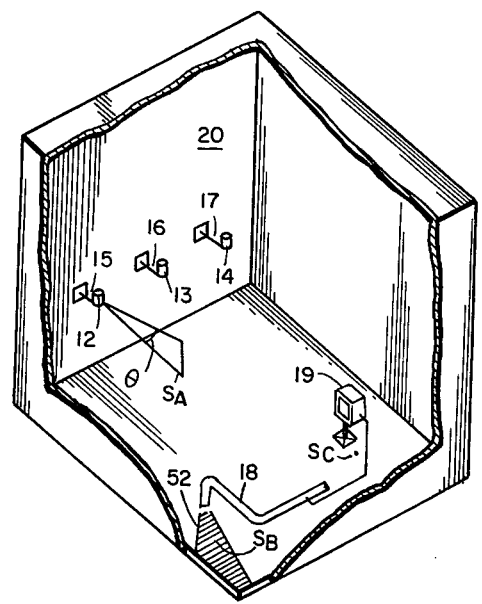
FIG. 2 is an isometric view illustrating a mounting arrangement of three omnidirectional detectors.

In FIG. 2, which is another preferred arrangement of the invention, three identical detectors 12, 13 and 14 are mounted on a vertical wall 20 by supports 15, 16 and 17 which are of equal length and at equal elevations. The detectors 12, 13 and 14 are therefore arranged in a horizontal line and also lie in a horizontal plane common to the radiation source $S_A$. Items 18 and 19, for illustration purposes, are obstructions between radiation sources $S_B$ and $S_C$ and detectors 12, 13, and 14. In practice, the assumption that any source, say $S_A$, and detectors 12, 13 and 14 lie in the same plane will usually be a rough approximation. The detectors 12, 13 and 14 are located at some fixed distance from the floor. The elevation of the source can be anywhere from the floor to the top of the room. In the case of a leak of an activated liquid, the most likely location of this source is on the floor. When the source location is determined and is on the same plane as the detectors, this location will be at some location (x, y). If it is not on the same plane but is at location (x', y', z'), the location (x, y) is in error by $$\frac{((x-x')^2+(y-y')^2)^{\frac{1}{2}}}{(x^2+y^2)^{\frac{1}{2}}} \times 100\%.$$

A 5% location error will usually be acceptable and exists when $\cos\phi=0.95$ or $\phi=18°$ ($\phi$ in FIG. 2 is the vertical angle from the detector 12 to source $S_A$). This means that when a plane space geometry is used, the horizontal distances are expected to be much greater than the vertical distances.

In a plane space set-up, the source strength and field intensity relationship, $I=kS/d^2$, applies as previously described. The three detectors 12, 13 and 14 measure field intensities $I_1=kS/d_1^2$, $I_2=kS/d_2^2$, and $I_3=kS/d_3^2$ respectively. The locus of possible source locations, defined by $I_1/I_2$ equals a constant, is a circle. Similarly, the locus $I_1/I_3$ equals a constant, determines another circle. These two circles intersect at two points. One is the real source location and the other is an imaginary solution.

The three detectors may be arranged in any pattern on the reference plane to achieve the above result. One pattern which may be used as shown in FIG. 7, has the three detectors 12, 13 and 14 arranged to form a right angle. This arrangement provides a good geometry for the intersections of circles 57 and 58 generated from detector pairs 12 and 13, and 13 and 14 respectively. This arrangement also provides a convenient reference axis for defining the location of source $S_A$. However, to determine which intersection is the real location of source $S_A$ and which is the location of imaginary source $\bar{S}_A$, may not always be obvious from the geometry.

The most simplified system is obtained when the three detectors 12, 13 and 14 are arranged in a straight line as shown in FIG. 2. A plan view of detectors 12, 13 and 14 is given in FIG. 6. The circles 48 and 49 are generated by detector pairs 12 and 13, and 12 and 14 respectively. Circle 48 passes through source $S_A$ with centre 51 on the y axis, and circle 49 also passes through source $S_A$ with centre 50 on the y axis. Centres 50 and 51 do not coincide with each other or with any detector except in the special case that a source is located at a detector.

The intersections of circle 48 and circle 49 as given by FIG. 6 is at two points, $S_A$ and $\bar{S}_A$, which are on either side of the y axis. One intersection at $S_A$ is the real source location and other intersection at $\bar{S}_A$ is an imaginary source location. By locating detectors 12, 13 and 14 in proximity to wall 20, it is known that the intersection, which is outside the coverage area, i.e., on the other side of the wall 20, locates an imaginary source $\bar{S}_A$. Therefore, it can be deduced that the other intersection is the real location of source $S_A$. In practice, the detectors 12, 13 and 14 are located several feet from the wall 20 to lessen background scatter effects.

In the configuration with four detectors, as in FIG. 1, the detectors 1, 2 and 3 are arranged in a straight line and 4 is offset. The signals produced by detectors 1, 2, 3 and 4 are $I_1$, $I_2$, $I_3$ and $I_4$ respectively. Detectors 1, 2, 3 and 4 are located at (0,0,0), (0,$b_2$,0), (0,$b_3$,0) and (0,$b_4$,$c_4$) respectively and a source S, e.g. source $S_A$, is located at (x,y,z).

The point source equations below give the source location:

$$x = \pm\left[\frac{b_2^2(1-A)}{A^2} - \left(\frac{Bb_2^2 - Ab_3^2}{2(Bb_2 - Ab_3)} - \frac{b_2}{A}\right)^2 \right.$$
$$\left. - \left(\frac{A(b_4^2 + c_4^2) - Db_2^2}{2c_4A} - \frac{Ab_4 - Db_2}{2c_4A} \times \left(\frac{Bb_2^2 - Ab_3^2}{Bb_2 - Ab_3}\right)\right)^2\right]^{\frac{1}{2}}$$

$$y = \frac{Bb_2^2 - Ab_3^2}{2(Bb_2 - Ab_3)}$$

$$z = \frac{A(b_4^2 + c_4^2) - Db_2^2}{2c_4A} - \frac{Ab_4 - Db_2}{2c_4A} \times \left(\frac{Bb_2^2 - Ab_3^2}{Bb_2 - Ab_3}\right)$$

where
$A = 1 - I_1/I_2$
$B = 1 - I_1/I_3$
$D = 1 - I_1/I_4$

For only three detectors 12, 13 and 14, which are all arranged in a straight line as in FIG. 2, the detection system applies to a plane space as described previously. The detectors 12, 13 and 14, which produce signals $I_1$, $I_2$ and $I_3$, are located at (0,0), (0,$b_2$), and (0,$b_3$) respectively. The source S, e.g. source $S_A$, is located at (x,y).

The point source equations can be simplified from the three dimensional case and reduce to $$x = \pm\left[\frac{b_2^2(1-A)}{A^2} - \left(\frac{Bb_2^2 - Ab_3^2}{2(Bb_2 - Ab_3)} - \frac{b_2}{A}\right)^2\right]^{\frac{1}{2}}$$

$$y = \frac{Bb_2^2 - Ab_3^2}{2(Bb_2 - Ab_3)}$$

where
$A = 1 - I_1/I_2$
$B = 1 - I_1/I_3$

Figure 3:
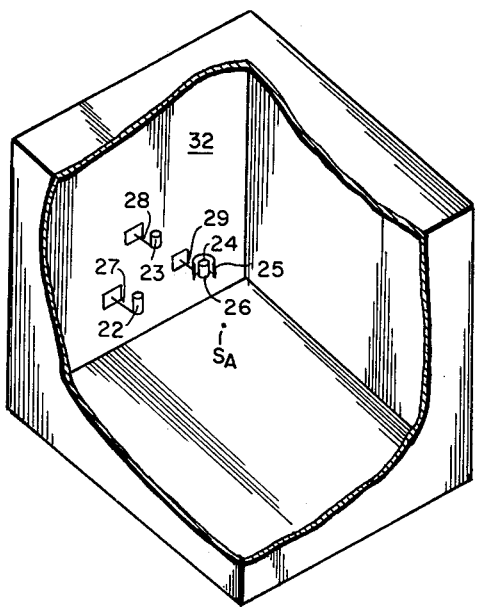
FIG. 3 is an isometric view illustrating a mounting arrangement of two omnidirectional detectors and one directional detector.

Another method for locating radiation sources is given in FIG. 3. This method uses the feature which makes use of both omnidirectional detectors and a directional detector and gives unique source locating characteristics. In FIG. 3, there are two omnidirectional detectors 22 and 23 and a directional detector which consists of an omnidirectional detector 24 and a shield 25 that rotates. The shield 25 contains a window or slot 26 which is used for viewing any source as it rotates. By means of the detectors 22, 23 and 24, as outlined here, it is possible to locate a source in three dimensions.

Figure 8:
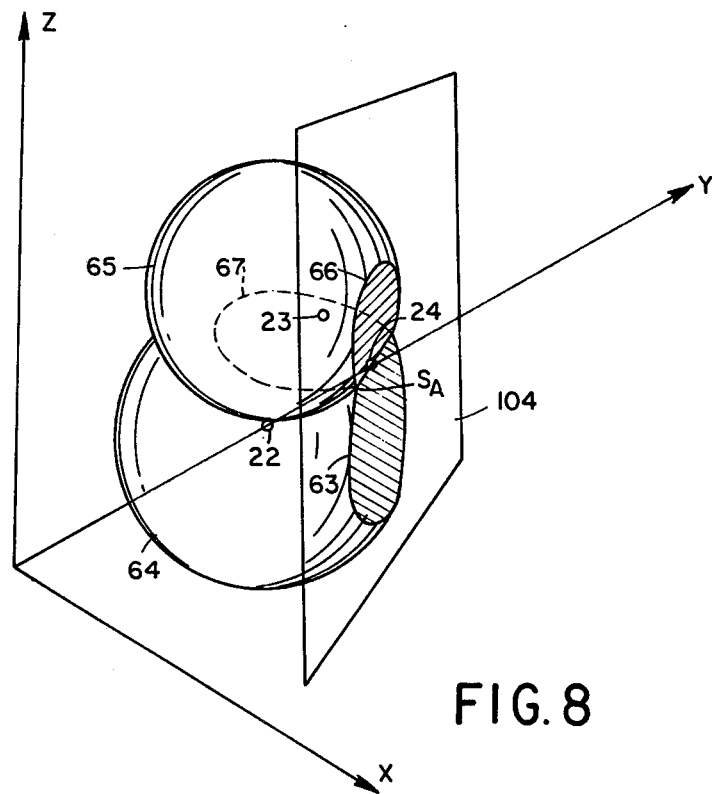
FIG. 8 is an isometric view illustrating the principle of operation of the present invention as applied to FIG. 3 for a three dimensional space.

As shown in FIG. 8 rotation of the shield 25 provides a plane of directivity 104 from the source, say $S_A$, to the detector 24. The inverse square relationship $I_1 = kS/d_1^2$, $I_2 = kS/d_2^2$ and $I_3 = kS/d_3^2$ applies for detectors 22, 23 and 24 respectively. The solution of these equations yields two spheres 64 and 65 as the loci of possible source locations. The intersection of spheres 64 and 65 is a circle 67. The intersection of circle 67 with plane 104 is at triple intersection point $S_A$.

Figure 4:
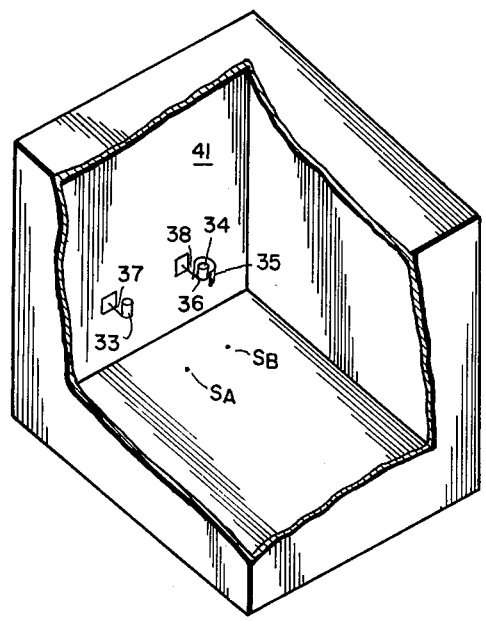
FIG. 4 is an isometric view illustrating a mounting arrangement of one omnidirectional detector and one directional detector.
Figure 9:
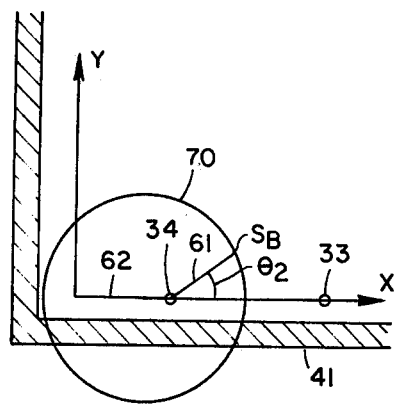
FIG. 9 is a top view illustrating the principle of operation of the present invention as applied to source $S_A$ of FIG. 4 for a two dimensional space.
Figure 10:
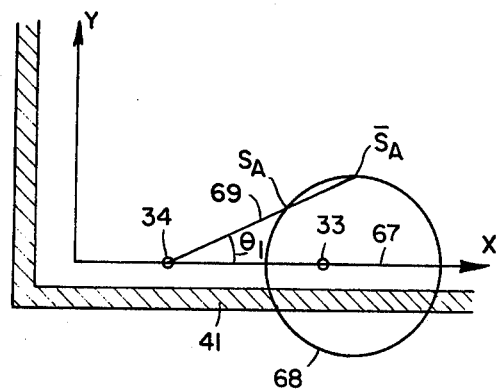
FIG. 10 is another top view illustrating the principle of operation of the present invention as applied to source $S_B$ of FIG. 4 for a two dimensional space.

A simplified version of this method exists for locating sources. This method also combines features of the two previously described detection methods and is shown in FIG. 4, FIG. 9 and FIG. 10. Only two detectors are required for a plane space detection system. One detector 33 is omnidirectional while the second detector 34 has a shield 35 which contains a window or opening 36 for viewing the source. Rotation of the shield 36 provides a line of directivity from the source, say $S_B$, to the detector 34. The inverse square relationship, $I_1 = kS/d_1^2$ and $I_2 = kS/d_2^2$, applies for both detectors 33 and 34 respectively. As shown in FIG. 9, the solution of these equations gives a circle 70 as the locus of possible source locations. The intersections of the circle 70 and the straight line 61 defined by the direction angle $\theta_2$ of shield 35 and the detector 34 gives the source location, $S_B$.

The detector 34 with the rotating shield 35 is taken to be located at (0,0); the detector 33 is located at (b,0); the direction angle of the rotating shield is $\theta$ and the source S, e.g. $S_B$, is located at (x,y). The solution to the source location is given by the following point source equations:

$$x = \frac{b(1 \pm (Rm^2 + R - m^2)^{\frac{1}{2}})}{(1 - R)(1 + m^2)}$$

and $$y = mx$$

where
$m = \tan \theta$
$R = I_1/I_2$

The geometry of intersection for the above method depends markedly on the source location. When the source such as $S_B$ in FIG. 9 is closer to detector 34 than detector 33, the circle 70 surrounds 34, and its intersection with the straight line locus 61 tends to be "radial". When the source such as $S_A$ in FIG. 10 is closer to 33 than 34, the circle 68 surrounds 33 and the intersection tends to be "tangential". When the source is equidistant between 33 and 34, the radius of the circle is infinite and the locus of the circumference is a straight line. Therefore, for a source equidistant between 33 and 34, the source location is given by the intersection of two straight lines.

The centre 62 of the circle 70 does not coincide with rotating detector 34 in FIG. 9. However, as the source location approaches detector 34, the centre 62 of the circle 70 approaches detector 34 and improves the geometry of intersection.

Once the source has been located, it is then possible to determine by calculation the size of the source. If the detector is a scintillation detector whose output varies with the total incident energy, the source location can be determined from the ratios of signal intensities of the detectors and the source size (curies) can be determined independently of the source energy emission level (Kev). The same is true of an ionization chamber whose output varies with the total incident energy. Although the output of a G-M tube is not energy dependent, it is still possible to implement the invention of locating the source using the ratios of signal intensities given by the G-M tubes.

A G-M tube, in addition to being relatively inexpensive, also has the desirable characteristics of high output, ruggedness, light weight, ability to operate in high radiation fields and has an essentially unlimited exposure with halogen quenching. These characteristics are utilized in a preferred embodiment of the invention which uses a G-M tube with a cylindrical metal cathode and a central wire anode. It is also preferrable to use a G-M tube with a thick wall metal cathode construction (e.g. 90 mg/cm$^2$ stainless steel). The thick wall construction is a simple and effective means to improve the photon absorption by the cathode from primary ionizing events due to high energy gamma as compared to low level background radiation. The cathode wall is also a shield for beta radiation which has a high absorption and short range even in air.

The response of a G-M tube is not energy dependent i.e. its response is not used to differentiate source energy emissions.

The pulse output rate or signal $I_S$ of a G-M tube is proportional to the rate of incident photons. In an area where no obstructions exist, the G-M tubes are subject to a similar spectrum of gamma energies. The radiation intensities at known locations can be compared by means of the pulse output from G-M tubes at these locations independently of the gamma energies. The location of a source, according to the principle of the invention, is based on the ability to determine the ratio of signal intensities between known locations and this is fulfilled by G-M tubes. If the source energy is not known and since the G-M tube response is not energy dependent, the assumption is then made that the average energy of each gamma emission from fission products is 700 KeV (Reference-Principles of Radiological Health, Gloyna & Ledbetter, Dekker Inc. 1969, p. 91). The signal $I_S$ from a detector at a known location is then used to determine the field intensity at that location. Because the source location is known by means of the appropriate point source equations, the distance between the source and the detector is also known. From the known field intensity and distance, it is then possible to calculate the source size and the possible radiation dose exposure.

If an estimated gamma energy level e.g. 700 KeV, is not reliable and the source energy level is not known, the source size cannot be determined unless one provides a detector such as a scintillation detector or ionization chamber to provide an absolute field intensity measurement at a known location. This field intensity measurement and known distance to the source can then be used to calculate the source size.

In order to locate a source according to the present invention, the ratio of the source-detector distance to the largest source dimension should be greater than 5. An unshielded source can be approximated by a point isotropic source for detectors located outside this range. In the context of this invention, when a radiation source has been located, it is considered a point isotropic radiation source and is the basis for determining the radiation field at other locations from the known source size. For practical purposes, it is not necessary to locate sources which do not at least produce high local radiation fields near the source i.e. within 25 cm, with respect to the background radiation because the relative hazard from such sources is minimal.

One of the basic principles of the invention relies on the use of omnidirectional detectors. An omnidirectional detector which looks at the total solid angle has four pi geometry. However, a four pi geometry detector is normally not required because the general location or direction of possible source locations is usually known i.e. up or down, east or west etc. Because detectors should not interfere with any operations and should have some physical protection, detectors are normally mounted at one side of an area rather than at the centre. It is therefore necessary to provide a detector which has omnidirectional characteristics primarily in the general direction of interest.

The plane in which sources may be found should be known for a two dimensional system. A G-M tube with a cylindrical cathode enclosure is omnidirectional in the plane at right angles to its central axis. If a long cylindrical G-M tube is mounted so that its central axis is vertical, the viewing is omnidirectional in the horizontal plane. It is also adequate for small viewing angles less than $\pm 18°$, approximately, in the vertical plane.

For viewing sources in a three dimensional system, a G-M tube with a cylindrical cathode enclosure is also adequate. An important consideration is that the solid angle presented by the detector at a given distance from the source should be constant regardless of the direction to the source. This is the ideal case. In order to approximate this, the axial length of the G-M tube with a cylindrical cathode is made approximately the same as the diameter. The wide angle response is thereby improved. For complete coverage of a wide frontal area, a G-M tube with four pi geometry is required.

For a two dimensional space, the computed location of a source is given by the intersection of two loci. Each of these loci include measurement errors due to the randomness of the signal counts and the limitations of the detection hardware. The computed source location is therefore an area of intersection or error area rather than a point intersection. The effective source location is nominally in the centre of this error area.

If points on one locus contain a possible error of $\pm\frac{1}{2}e_1$, and points on a second locus contain a possible error of $\pm\frac{1}{2}e_2$, the error area is given approximately by $e_1 e_2 \csc\theta$ where $\theta$ is angle of intersection of the locii. The smallest error area exists for $\theta=90°$ or $\csc\theta=1$. $\csc\theta$, and therefore the error area increases indefinitely as $\theta$ approaches zero.

In this invention, the selection of all combinations of detector pairs yields loci which are redundant. For example, with four omnidirectional detectors, the number of combinations of detector pairs is six. This gives six spheres which intersect at two points. Only three of these spheres are independently generated and depend on the first selected pairings of detectors. It is possible to obtain the optimum or smallest error area by a correct selection of detector pairs. This can be done if the most probable source locations are known and the detector pairs are selected accordingly. If warranted, the selection of detector pairs can be done by first roughly locating the source according to the principle of the invention and then make the correct selection of detector pairs. It is then necessary to repeat the source locating procedure to more accurately locate the source.

As is well known, a major problem in this type of measurement is background radiation. The most desirable situation is when no background exists so that the required number of counts to obtain a figure of accuracy for the radiation level with a given probability is a minimum. As the background increases the time and number of counts to obtain the same accuracy increases. This accuracy can be given by $V_S = \sigma_S/I_S$ where $V_S$, $\sigma_S$ and $I_S$ are the signal coefficient of variation, the standard deviation and the signal count rate (radiation intensity) respectively due to the source. For a sampling time of $t_T=t_B$ where T and B are subscripts for total and background signals respectively, $V_S$ can be expressed as $$V_S = \left(\frac{I_T + I_B}{t_T}\right)^{\frac{1}{2}} \times \frac{1}{I_T - I_B}$$

Any value of $V_S$ above a defined maximum value indicates an unreliable measurement. When this happens, the sampling time must be increased. This can be done when a fixed sampling time is used, by storing the total and background counts and adding them to the new counts from the next sample period. The computation for $V_S$ is then done on the total count of two sample periods.

In order to use the invention in a working environment where background radiation exists, it is necessary to monitor the background radiation as well as the signal radiation that is of interest. The source signal is obtained by subtracting the background signal from the total signal. Methods to monitor background radiation exists in the prior art and can be applied to the present invention.

In the preceding detailed description of the disclosure it has been assumed that only one significant source exists. Methods for locating this source, which are independent of source strength or variations in source strength, have been detailed. However, in practice it must be assumed that two or more significant sources can exist in one area at the same time. When, for example, two sources exist, the signal increase at each detector due to both sources is directly additive. If their relative sizes vary, they will cause the signals of these omnidirectional detectors to vary in a manner which disguises the effects of the individual source changes. If the growth rate (or decay) rate of one source is always known and if the size of this source at a given time is known, then by extrapolation to the corresponding time of the next measuring cycle and subtraction of the "known" signal from the total signal, it is possible to determine the signal contribution at each detector due to the second source. This would locate the second source and its size could be determined. The problem is that the growth rate of an accidental source cannot be extrapolated with any certainty for an extended period.

A method exists for separating the signal from the detectors into their components for as many as three sources with the use of three detectors. Some limitations are required in the application of this method to an area monitoring system. The limitations are that:

1. Two sources do not appear (or disappear) simultaneously. The minimum space between the appearance of two new sources is limited to a complete measuring cycle. However, the simultaneous existence of two or more sources is not limited.
2. All sources have stationary positions after being located.
3. At the time of the appearance of a new source, the rate of change of an existing source size does not occur when extrapolating between successive measuring cycles.

With these limitations, it is possible to establish the location of one new source at a time as the data is sampled. However, for existing sources, it is possible to track the simultaneous rate changes for 1, 2 or 3 sources. In general the number of sources which can be located by this method is equal to the number of detectors. If, however, it is known that only one source exists, the above assumptions are unnecessary and the source location can be tracked solely by the signal ratio method, i.e. the appropriate point source equations to determine the source location are applied.

For a system with three detectors $D_1$, $D_2$ and $D_3$ (12, 13 and 14 respectively in FIG. 2) in which three radiation sources $S_A$, $S_B$ and $S_C$ exist, the following multiple source equations can be written:

$$M_1I_{A1}+M_2I_{B1}+M_3I_{C1}=I_{S1}$$

$$M_1I_{A2}+M_2I_{B2}+M_3I_{C2}=I_{S2}$$

$$M_1I_{A3} + M_2I_{B3} + M_3I_{C3} = I_{S3}$$

where $I_{S1}$, $I_{S2}$, $I_{S3}$ are the sum of the radiation intensities from all sources indicated by $D_1$, $D_2$, $D_3$ respectively;

$I_{A1}$, $I_{A2}$, $I_{A3}$ are radiation intensities indicated by detector $D_1$, $D_2$, $D_3$ respectively when the source $S_A$ is originally located.

Similarly $I_{B1}$, $I_{B2}$, $I_{B3}$, and $I_{C1}$, $I_{C2}$, $I_{C3}$ are the radiation intensities indicated by $D_1$, $D_2$, $D_3$, when sources $S_B$ and $S_C$ are originally located;

$M_1$, $M_2$, $M_3$ are unknown multiplying factors which must be determined. These factors define the change in size of the original sources $S_A$, $S_B$ and $S_C$ respectively as compared to when they are first located.

The manner in which this set of equations can be used is illustrated by assuming that initially no sources exist. The first source $S_A$ is detected and the signals detected by $D_1$, $D_2$, $D_3$ are $I_{S1}$, $I_{S2}$, $I_{S3}$ respectively. The location of sources $S_A$ is determined by the point source equations given for detectors 12, 13 and 14. Also, since sources $S_B$ and $S_C$ do not yet exist, $I_{S1} = M_1I_{A1}$, $I_{S2} = M_1I_{A2}$, $I_{S3} = M_1I_{A3}$ and $M_1 = 1$ initially. If the source size varies at a later measuring time e.g. source $S_A$ doubles in size, then $I_{S1}$, $I_{S2}$ and $I_{S3}$ will double and $M_1 = 2$.

At a later time, source $S_B$ appears. The new signals $I_{S1}$, $I_{S2}$ and $I_{S3}$ are used to check the location of source $S_A$ only and determine its size. The new signals seem to indicate a "new" source $S_A$ location because the relative magnitudes of $I_{S1}$, $I_{S2}$ and $I_{S3}$ have changed. In fact, since source $S_A$ location cannot change, it indicates that a source $S_B$ exists and its location can be determined by assuming that the rate of change of source $S_A$ has not changed from the previously measured value. Therefore, the size of source $S_A$ can be determined by extrapolating the previously measured values of $M_1 I_{A1}$, $M_1 I_{A2}$, $M_1 I_{A3}$ to the new time. The difference between the extrapolated values of $M_1 I_{A1}$, $M_1 I_{A2}$, $M_1 I_{A3}$ and the new readings of $I_{S1}$, $I_{S2}$, $I_{S3}$ are the readings for source $S_B$. The readings for source $S_B$ are $M_2 I_{B1}$, $M_2 I_{B2}$ and $M_2 I_{B3}$. Because $M_2 = 1$ initially, therefore $I_{B1}$, $I_{B2}$ and $I_{B3}$ are known. The location and size of source $S_B$ can now be determined by applying the point source equations.

If either or both of sources $S_A$ and $S_B$ vary in size, the ratio $I_{S1}/I_{S2}/I_{S3}$ will change. The solution of simultaneous equations defining $I_{S1}$, $I_{S2}$, and $I_{S3}$ will give the new values of $M_1$ and $M_2$ which are consistent for all equations defining $I_{S1}$, $I_{S2}$ and $I_{S3}$. Hence the new size of sources $S_A$ and $S_B$ can be determined. In general, if there is a ratio change to $I_{S1}/I_{S2}/I_{S3}$, it can be the result of two conditions:

(1) one or all of existing sources have a new size
(2) a new source has been introduced to the system.

If condition (1) applies and two sources $S_A$ and $S_B$ exist, it is possible to solve for $M_1$ and $M_2$ using equations for $I_{S1}$ and $I_{S2}$, and also again for $M_1$ and $M_2$ using equations for $I_{S1}$ and $I_{S3}$. In this situation, both solutions for $M_1$ and $M_2$ will be identical. Hence the new size of sources $S_A$ and $S_B$ can be determined.

If the two solutions for $M_1$ and $M_2$ using $I_{S1}$, $I_{S2}$, and then $I_{S1}$, $I_{S3}$ are different, it indicates that a new source $S_C$ has been introduced to the system (condition 2). By extrapolation of the known values of $M_1 I_{A1}$, $M_1 I_{A2}$, $M_1 I_{A3}$ and $M_2 I_{B1}$, $M_2 I_{B2}$, $M_2 I_{B3}$ to a later time and using the known rates of change at the previously sampled value, the size of source $S_A$ and $S_B$ can be determined. Then the size and location of source $S_C$ can be determined as explained previously for source $S_B$.

If any or all of sources $S_A$, $S_B$ and $S_C$ vary in magnitude, this can be determined by the solution of the simultaneous equations defining $I_{S1}$, $I_{S2}$ and $I_{S3}$.

If a fourth source appears when a three detector set is used, the above multiple source method can approximately locate the fourth source if one or more of the other three sources are of much less significance i.e. neglect the least significant source.

Another common problem which can exist is that of shielded sources. In a preferred arrangement using three fixed detectors as in FIG. 2 for example, there can be no assurance that some object will not be interposed between a source and one or more of the detectors. In fact, the likelihood that this will happen is high. For instance, a leakage of an activated liquid could collect behind some equipment or container and not be in the direct "line of sight" of two of the detectors while it radiates directly on the third detector. Using the ratios of the detector signals as previously described leads to an incorrect source location if no correction is made for absorption and buildup between the source and detector. Since the location of the source is not known in the first place, it is difficult to know what correction factors should be applied.

A solution to this problem can be found if it is assumed that the physical geometry of the area and all the equipment, pipes, containers and material, etc. in that area are known. This is a reasonable assumption to make for most areas of a reactor where location, size and material are defined by the plant design. Some exceptions to this are the movement of a fuelling machine, other vehicles or material storage.

With the physical geometry known completely and a defined source radiation energy (kev), it is possible to calculate what is the ratio of the signal intensities (count rates) at any two detectors for a source at any point location. This means that every point location can be assigned a set of signal ratios to define its geometrical co-ordinates. In other words, the area consists of a grid and each grid intersection point has a set of signal ratios $(I_1/I_2, I_1/I_3)$ which define the (x,y) co-ordinate of that point. Therefore, in this grid technique, there is a unique one to one correspondence between the signal ratio sets and the source location for a given area and detector geometry.

As an example, assume in FIG. 2 the signal to detector $D_1$ (12) from source $S_B$ at location (x,y) is attenuated 50% by pipe 18, the signal to detector $D_2$ (13) is attenuated 50% by pipe 18 and there is no attenuation to detector $D_3$ (14).

The signals received from $D_1$, $D_2$ and $D_3$ are $I_1$, $I_2$ and $I_3$ respectively, which give the signal ratio set $(I_1/I_2, I_1/I_3)$ to define the point location of the source $S_B$. By comparison, if no absorption and buildup exists, the received signals would be $I_1'$, $I_2'$ and $I_3'$ where $I_1' = 2I_1$, $I_2' = 2I_2$ and $I_3' = I_3$. Therefore, for this latter condition, the same point location would be defined by the ratio set $(I_1'/I_2', I_1'/I_3')$, which is the same as $(I_1/I_2, 2I_1/I_3)$.

When the source has a single known radiation energy, it is possible to calculate the field at a remote point knowing the path length but it is also necessary to consider the effects of attenuation caused by interposed objects on the energy rays which pass through them. These effects are the absorption and buildup factors due to narrow and broad beam geometry. For increasing shield thickness, the signal is decreased by absorption in narrow and broad beam geometry and increased by buildup factor in broad beam geometry. For the shielded sources of this application, conditions of broad beam geometry will usually exist.

Usually when a radiation source appears as a result of some accidental event, its energy is not known. This may be due to the unknown origin of the radiation source or because of the source energy change due to decay processes. Since attenuation is a function of radiation energy, the field (R/hr) at a given point due to a shielded source of N curies with energy $E_1$ is different than the field due to another source of N curies with the same location and shielding, but with energy $E_2$. Over a period of time, a single source may even undergo a change by decay in radiation energy from $E_1$ to $E_2$. For a source of energy $E_1$ and a defined location it is possible to calculate the signals at the detectors. The ratios of detector signals determines the source location by the grid technique as outlined above but only for a source of energy $E_1$.

As the source energy changes from $E_1$ to $E_2$, the detector signals will change. (In actuality, $E_1$ and $E_2$ would be the averages in a spectrum of gamma energies). They will not necessarily be in the same ratio because of the different effects of attenuation at energy $E_2$. This means that the ratio of detectors signals is not the same for energy $E_2$ as for energy $E_1$ at a given source location, i.e. the set of signal ratios to define a shielded source location depends on the source energy.

In order to account for this situation it is necessary to have a set of signal ratios to cover the grid area at a number of energies over the spectrum of interest. For economy, the number of energies to cover the energy spectrum must be arbitrarily limited e.g. 200 Kev, 700 Kev and 2000 Kev.

These energies have significantly different factors of attenuation so that the signal ratio set for a given source location will be different for different source energies. It is also possible that a given signal ratio set can define a source location for energy $E_1$, and can define another source location for energy $E_2$. Since this situation is predictable for selected source energies, the most likely source location can normally be selected from the known geometry of the area without the provision of energy discrimination on the detectors.

For the given area and detector geometry, a ratio set is calculated for each grid intersection point and stored in the computer memory. This is repeated for each of the selected source energies ($E_1$, $E_2$, $E_3$). It is necessary to have grid intersections spaced sufficiently close to accurately locate the source. However, a too closely spaced grid will use an excessive amount of memory without any practical improvement to the accuracy of the source location. When signal readings are obtained from the detectors, a signal ratio set is determined from these readings. This signal ratio set is then compared with the ratio set in the computer memory lookup table. The ratio set in the computer memory lookup table in closest arrangement with the signal ratio set is taken as the one which defines the source location.

When a new set of readings are taken at a later time, the signal ratio set for the given source at the same location at a constant energy will remain the same even though the size of the source varies. The comparison with the ratio set in the computer memory remains constant so that the observed location is constant. However, over a period of time, the energy of a given source may vary from $E_1$ to $E_2$ so that the signal ratio sets will change. When the comparison is made with the signal ratio set at energy $E_1$, a change shows up but when the comparison with the signal ratio set is made at the correct energy $E_2$, the ratio sets are found to be the same. It is then known that the energy of the source is $E_2$ and the source location is unchanged.

The number of points formed by the grid intersections can be large and so a large amount of computer memory is required to accommodate the ratio set data for each point. It is likely that some areas will have many pieces of equipment, pipes, containers, etc. which will be obstructions between possible source locations and the detectors. For these areas, a complete grid is required. Other areas may be completely open and have no obstructions. For these areas, the source location can be determined from calculations by the use of the signal ratio method as defined by the appropriate point source equations and therefore, the grid technique with its computer memory is not required.

Another type of area may have just one or only a few minor obstructions so that a complete grid coverage is not required. In such cases as in FIG. 2 it is necessary to determine the shadow area 52 of the pipe 18, in which a source such as $S_B$ is always shielded from one or more detectors. The grid coverage is then required only for these shadow areas. The ratio sets for only the grid intersections in these shadow areas are required in the computer memory. In order to determine the source location for this area, the computer memory is first searched and comparisons between the signal ratio set and the ratio sets in storage are made as described on pg. 33 to find the correct ratio set. If a valid comparison cannot be made, then the source location is not in any of these shadow areas and so must be outside the shadow areas. The source location is then determined from calculation by the use of the signal ratio method as defined by the appropriate point source equations.

Figure 11:
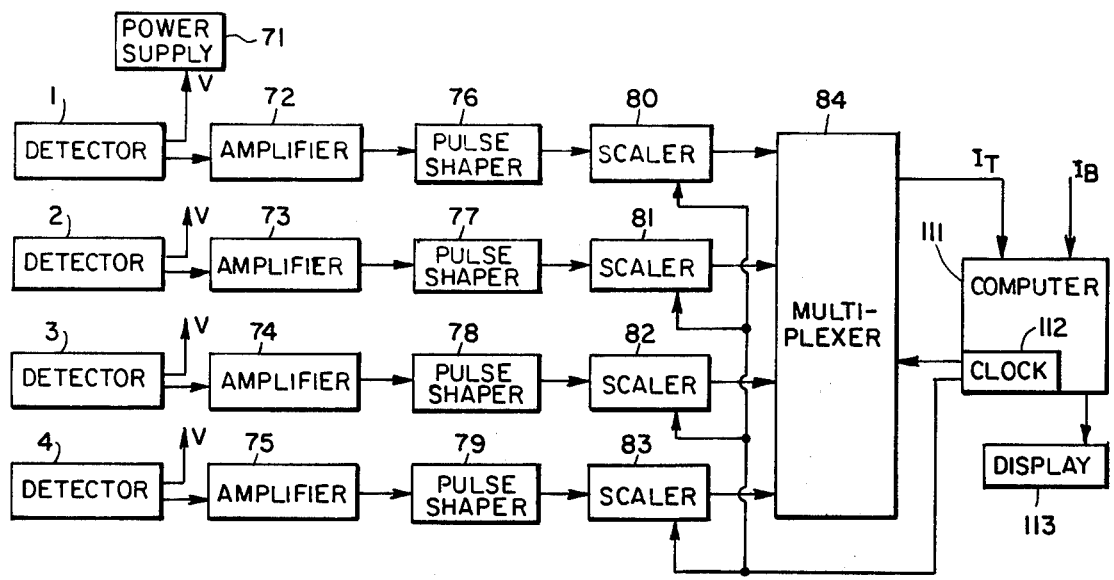
FIG. 11 is a block diagram of the detectors and electronic circuitry of the present invention as applied to FIG. 1.

In FIG. 11, a block diagram shows the detectors, and computing system with a data or signal acquisition system as an embodiment of the present invention to locate and size radiation sources. FIG. 11 shows four detector channels which are similar. The four G-M detectors 1, 2, 3, and 4 are powered by a single stable high voltage power supply 71 so that any high voltage change affects all detectors equally. The detectors 1, 2, 3 and 4 have isolation output amplifiers 72, 73, 74 and 75 because of the loading and interference in long transmission lines. These are fed to pulse shapers 76, 77, 78 and 79 respectively. Pulse shapers 76, 77, 78 and 79 remove low level noise signals, limit the pulses to a standard height necessary for operation of the scalers 80, 81, 82 and 83 respectively and also limit the pulse width so that there is no count loss by the scalers due to high count rates detected at any of the detectors 1, 2, 3 and 4.

Scaler 80, 81, 82 and 83 totalize the pulse inputs continuously once they have been set to count by the computer clock 112. The clock 112 also controls the scanning of multiplexer 84 so that the computer 111 can store the counts on scalers 80, 81, 82 and 83 after a fixed time interval with respect to the scaler set signals. After the scaler counts have been fed to the computer 111, scalers 80, 81, 82 and 83 are reset and later set to start a new count.

The output of multiplexer 84 is the total signal $I_T$ consisting of source signal $I_S$ plus background signal $I_B$ and this output is fed to computer 111. The background signal is subtracted from the output of multiplexer 84, in computer 111 to give the source signal $I_S$. Analysis of the source and background signals by computer 111 first ensures that the source signal is sufficiently large to provide a reliable signal and then the location of the source is determined.

The reference oscillator shown as clock 112 in computer 111 synchronizes the operation of computer 111, multiplexer 84 and scalers 80, 81, 82 and 83.

Computer 111 contains a program to operate on the source signals to determine the location of any radiation sources based on the methods which are disclosed herein. The calculated results of the source location and their sizes are given on a digital display unit 113. The source locations are given in rectangular co-ordinates, for example, and the source sizes are given in units of radioactivity such as microcuries. Alternatively, the display may be arranged to show an outline of the monitored area with any sources indicated by points on a CRT.

FIG. 11 has four channels with detectors 1, 2, 3 and 4 and the associated signal acquisition system. This is suitable for implementing the configuration of the invention as given by FIG. 1. In order to implement the invention with three detectors as in FIG. 2, one of the identical detector channels, e.g. detector 4 and associated signal acquisition channel, is omitted.

Figure 12:
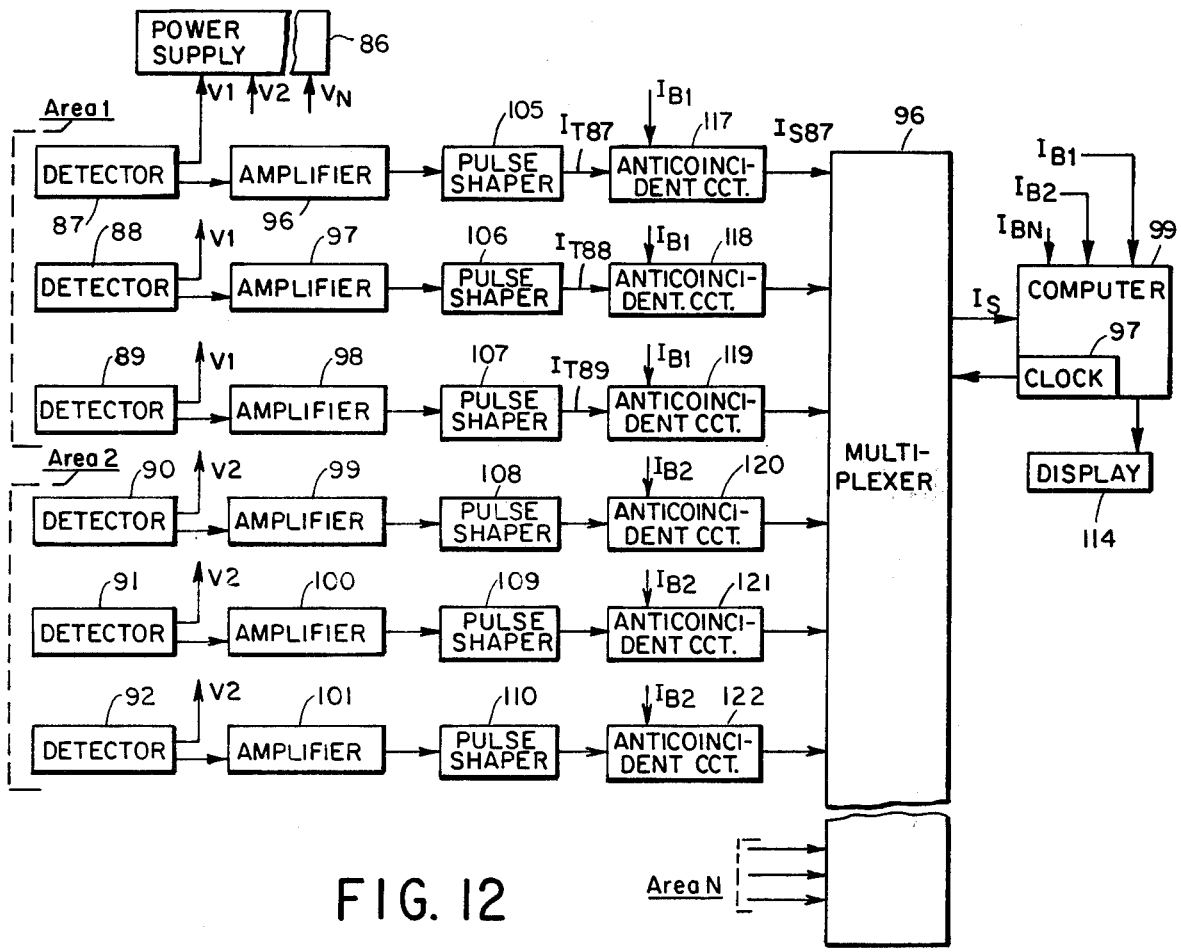
FIG. 12 is a block diagram of the detectors and electronic circuitry of the present invention which is suitable to monitor one or more locations for which the detector arrangement of FIG. 2 is typical.

In FIG. 12, a block diagram shows the detectors, and computing system with a signal acquisition system as an embodiment of the present invention to locate and size radiation sources in one or more areas. The primary difference between FIG. 11 and FIG. 12 is that FIG. 12 shows a system where several areas are monitored simultaneously whereas in FIG. 11 only one area is monitored. A duplication of FIG. 11 to monitor several areas simultaneously is possible but separate scalers are not economic, i.e. a separate scaler 80 for each channel of several areas. In the application of FIG. 12, the expected counting rates and the maximum number of monitored areas are matched so that it is possible to do the counting by means of the interrupt features of computer 99.

The system as given by FIG. 12 shows detectors 87, 88 and 89 which are set up to monitor one area, detectors 90, 91 and 92 monitor a second area, and so on for other areas that must be monitored. The detectors such as 87, 88 and 89 receive power from a stable high voltage power supply 86. The description to follow uses detectors 87, 88 and 89 but applies to the other detector channels as well.

Detectors 87, 88 and 89 have isolation output amplifiers 96, 97 and 98 respectively. These amplifiers in turn are connected to pulse shapers 105, 106 and 107 respectively in order to remove low level noise and limit the output pulse height and width. The total signals $I_{T87}$, $I_{T88}$, $I_{T89}$ of pulse shapers 105, 106 and 107 are applied to anticoincident circuits 117, 118 and 119. The background signal for the area $I_{B1}$ is also applied to each of the anticoincident circuits 117, 118 and 119. This removes the background signal from the total signal to give the source signal at the output of the aforementioned anticoincident circuits.

All of the outputs of anticoincident circuits such as 117, 118, 119 in FIG. 12 feed the computer 99 through multiplexer 96. The scan rate of multiplexer 96 is selected so that the addressing period matches the maximum detector count rate. This is necessary because a detector count may be counted twice if the addressing period is too short or a detector count may be lost if the addressing period is too long. For example, if a pulse produced by detector 87 arrives just after the multiplexer 96 has addressed the output at anticoincident circuit 117, the pulse width is such that it is picked up when 117 is next addressed.

For each detector such as 87, there is an assigned storage location or bin in the computer memory, which stores the counts from that detector. When multiplexer 96 addresses the output of anticoincident circuits 117 ($I_{T87}$-$I_{B1}$) and a source signal $I_{S87}$ exists, it is first received at an intermediate memory or buffer storage. At a suitable time, interrupt logic switches the program control to an interrupt routine which allows this signal count $I_{S87}$ to be added to the count in the assigned storage bin i.e. the bin count increases by one. However, if no count exists due to detector 87, the bin count remains unchanged.

After addressing circuit 117, multiplexer 96 addresses the next detector channel at circuit 118. In like manner, an assigned storage bin count for a detector is increased by one if a count exists or remains unchanged if no count exists. Similarly, multiplexer 96 continues to address all channels and the computer stores the counts in the appropriate storage bins. This process continues and repeats for a fixed period of time e.g. 10 seconds for a complete measuring cycle. The accumulated counts (source signals) in the storage bins are then used to compute the source location and the storage bin counts are reset for a new cycle.

The computer 99 contains a reference oscillator shown as clock 97 to synchronize the operation of computer 99 and multiplexer 96. Computer 99 contains a program to operate on the source signals to determine the location of any radiation sources in each of the monitored areas based on the methods which are disclosed herein. The calculated results of source locations and sizes are shown on a digital display 114. This is similar to that described for the display of FIG. 11.

FIG. 12 is presented using sets of three detectors where each set monitors a separate area in an arrangement similar to that given by FIG. 2. In order to implement the configuration for each area as given by FIG. 1, and additional fourth detector and signal acquisition channel is required for each area.

Figure 13:
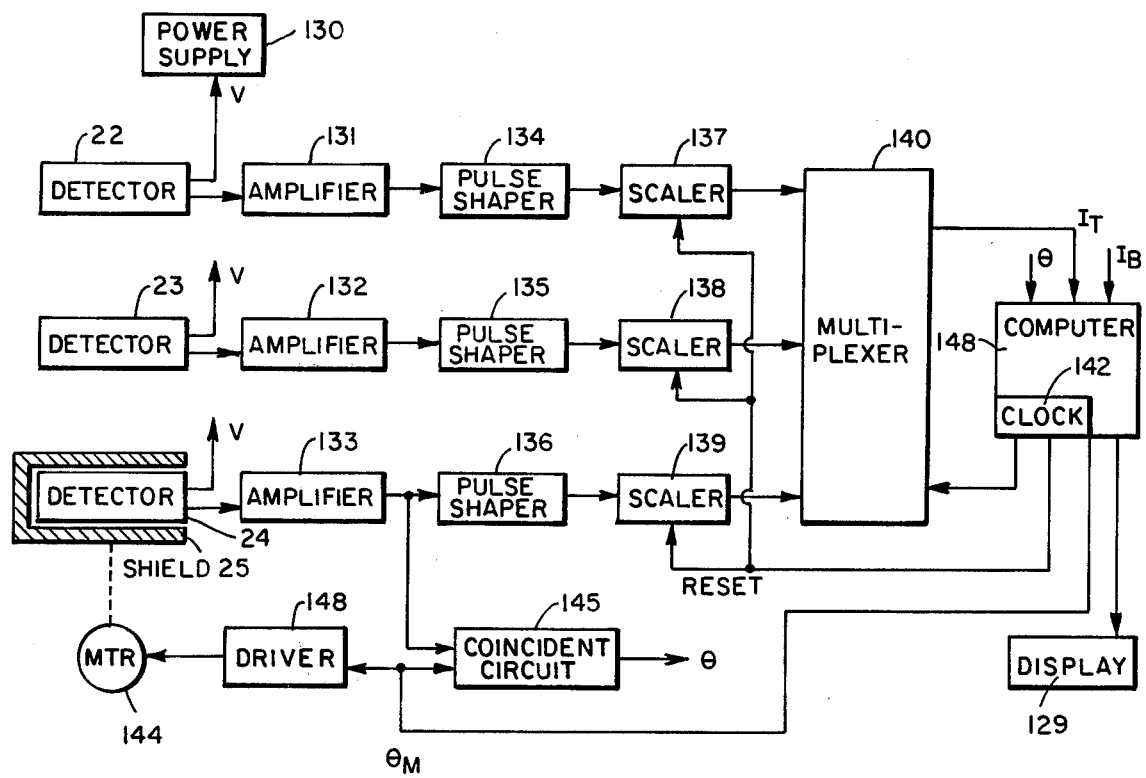
FIG. 13 is a block diagram of the detectors, electronic circuitry and shield of the present invention which is suitable to monitor a location for which the detector arrangement of FIG. 3 is typical.

In FIG. 13, an electrical block diagram shows the detectors, and computing system with a signal acquisition system as another embodiment of the present invention according to FIG. 3 to locate and size radiation sources. The G-M detectors 22, 23 and 24 receive power from a stable high voltage power supply. The instrumentation chain consisting of detectors 22, 23 and 24 are connected respectively to isolation amplifiers 131, 132 and 133, then to pulse shapers 134, 135, and 136, and then to scalers 137, 138 and 139. The scalers 137, 138 and 139 feed computer 141. Clock 142 controls the addressing of multiplexer 140 and the set/reset for scalers 137, 138 and 139.

In order to account for the fact that the shield 25 reduces the count rate of detector 24 in proportion to the degree of shielding, the computer provides a suitable multiplying factor to the signal count of detector 24 to normalize the count with respect to detectors 22 and 23 i.e. if the shield 25 covers 300° and the window 26 is 60° wide, the multiplying factor is 6.

A distinguishing feature of FIG. 13 as compared to FIG. 11 is that a phase referenced pulse $\theta_M$ from clock 142 also provides the signal to driver 148 which controls the servomotor 144 to rotate the shield 25. The signal $\theta_M$ and the output of amplifier 133 are both fed to coincident circuit 145. When a count appears at amplifier 133, the coincident circuit 145 produces a signal $\theta$ whose phase is used to indicate the directional position of shield 25 at the time the count from amplifier 133 was produced. This signal $\theta$ together with the signals $I_T$ and $I_B$ is used by the computer 141 to determine the source location as given by the point source equations for a directional and an omnidirectional detector described herein.

An apparatus and method with various embodiments have been described for locating and sizing radiation sources. Methods have also been outlined to handle some problems which may be encountered in an environment such as a nuclear reactor. These various methods are integrated into one system by providing a computer (e.g. 111 in FIG. 11) with suitable algorithms to analyze the incoming signals as they are being delivered from the detectors by the signal acquisition system.

The operations for the computer program are initialization, signal acquisition, signal storage, background correction, signal resolution of multiple sources to single sources, signal validation, determination of relative intensity between detector signals due to common sources, location of sources (shielded and/or unshielded), sizing of sources, displaying results and alarming for high radiation levels or large source sizes.

With reference to FIG. 11, computer 111 is initialized at the start of operation to know what sources exist if any as given by a radiation survey, calculations or historical data. This data is preprogrammed into the computer memory to be an initial reference. Once the system begins operation, the signal acquisition system consisting of amplifiers 72, 73, 74 and 75, pulse shapers 76, 77, 78 and 79, scalers 80, 81, 82 and 83, and multiplexer 84 provide signals $I_T$ from detector 1, 2, 3 and 4 to computer 111 as previously given on page 36. A background signal $I_B$ from the monitored area is also provided to computer 111. Signal $I_B$ is subtracted from $I_T$ to give the corrected source signals $I_S$ for each of detectors 1, 2, 3 and 4. Signals $I_B$ and $I_T$ are stored when received and $I_S$ is stored when calculated. The new signals $I_T$, $I_B$ and $I_S$ are stored in temporary bin locations until completion of the analysis of the new signal data. The new signals are then placed in computer memory to replace equivalent "old" signal data.

After $I_T$, $I_S$ and $I_B$ are stored, the next step in the analysis is to resolve the source signals of detectors 1, 2, and 3 and 4 into new component parts which may have varied with reference to the values of the previous cycle due to either changes in source sizes or the appearance of new sources. The computer memory provides the source signals for the immediate past and an algorithm based on the multiple source equations is used to resolve the source signals into the changed components or determine the components of a new source.

Signals $I_{S1}$, $I_{S2}$, $I_{S3}$, $I_{S4}$ have components $I_{41}$, $I_{42}$, $I_{43}$, $I_{44}$ from detectors 1, 2, 3 and 4 due to source $S_4$ in a four detector system. The signal coefficient of variation of each signal $I_S$ i.e. $I_{41}$, $I_{42}$ etc. is validated by a check of the coefficient of variation $V_S$ to determine if the new source signals are reliable. If any component is not reliable, the source is not located and the procedure to determine reliability is repeated on the new signals of the next measuring cycle.

If signal changes exist and no new source has appeared (the signal ratios are constant as determined from the multiple source equations) and the signals have been validated with respect to background, the new source sizes are calculated. The results are then stored in memory, shown on a digital display and alarms initiated if necessary.

If a new source appears as determined from the multiple source equations, the ratio of the signal intensities between the detectors due to the new source are calculated. This provides a new signal ratio set which can be used to determine the source location. A check is first made for shielded source locations by searching the computer memory which is provided with ratio set data and comparing this data with the new signal ratio set. The memory, which is searched, contains ratio set data for three source energy levels to cover the necessary energy spectrum. The source is located when a valid comparison is made.

If a valid comparison is not made for a shielded source location, a computer algorithm applies the new signal ratio set to the appropriate point source equations to determine the location of the unshielded source. The results are then stored in memory, shown on a digital display and alarms initiated if necessary.

When computer 111 has analyzed, stored and displayed the signal source data from the detectors, it then repeats the operation for the next cycle. For efficient data handling, the data handling system operates as two parts. One part is signal acquisition and the second part is signal analysis. These two parts are synchronized by clock 112. For optimum source detection capability, the signal data is analyzed on one cycle while the signal acquisition system is acquiring new data for the next cycle and this technique of the prior art can also be extended to the multichannel detection system of FIG. 12.

The description of this invention has been primarily described using G-M tubes. However, there are other types of ionizing detectors beside G-M tubes which are possible such as ionization chambers and proportional counters.

Scintillation detectors, which includes the associated photomultiplier tubes, have also been mentioned as a type of detector. The use of other solid state detectors such as silicon depletion layer detectors is also possible. The use of various solid state detectors or ionizing detectors with their particular characteristics will be apparent to those skilled in the art.

This invention discloses various detector arrangements which use up to four detectors to locate sources in a given area. It is possible to extend the capabilities of the system by using additional detectors to locate a larger number of sources which exist simultaneously. If a sufficient number of detectors are used, a mosaic pattern of a large number of sources in an area can be obtained. The extension of this invention to a large number or array of detectors to locate many sources by means of an expanded data acquisition and computer system will be apparent to those skilled in the art.

The computer to execute control for this invention can be done by a process computer in which the radiation detection system is one of a number of processes which are controlled using the necessary software. The advent of microprocessor technology makes it feasible to use a dedicated computer such as a microprocessor for this remote radiation detection system with a single channel or a multi-channel capability.

A system in which the signal acquisition hardware and the microprocessor are in a self-contained unit can also be portable. By connecting this portable unit to a set of omnidirectional radiation intensity responsive detectors which respond to the radiation of interest, the operator in the field can know the source sizes and locations of radiation sources with respect to a known location and a known orientation of the detector set. The application of a set of detectors for a portable instrument will be apparent to those skilled in the art.

Other embodiments of the present invention are possible. Numerous changes and modifications can be made to the preferred embodiments of this disclosure by one skilled in the art without departing from the present invention, the scope of which is defined by the appended claims.

The embodiments of the invention in which an exclusive property or privilege is claimed are defined as follows.

1. A radiation detection system comprising omnidirectional broad-band radiation detector means without radiation attenuating shielding and means responsive to said detector means for determining the location of a source of radiation.

2. A radiation detection system comprising fixed position omnidirectional radiation detector means without radiation attenuating shielding and means producing loci of signal ratios responsive to said detector means for determining the location of a source of radiation.

3. A radiation detection system comprising fixed position omnidirectional radiation intensity responsive detector means without radiation attenuating shielding and computer means producing intersecting loci of signal ratios responsive to said detector means for determining the locations of sources of radiation.

4. A radiation detection system as in claim 3 in which said detector means respond to electromagnetic radiation.

5. A radiation detection system as in claim 3 in which said detector means respond to nuclear radiation.

6. A radiation detection system as in claim 3 in which said detector means is comprised of G-M tubes.

7. A radiation detection system as in claim 6 in which said G-M tubes are each constructed with a narrow anode centred in a cylindrical cathode to provide omnidirectional detecting characteristics.

8. A radiation detection system as in claim 3 in which said detector means is comprised of scintillation detectors.

9. A radiation detection system as in claim 3 in which said detector means is comprised of ion chambers.

10. A radiation detection system comprising a plurality of fixed position omnidirectional radiation intensity responsive detectors each responsive to radiation for producing a detector signal; and means including computer means connected to said detectors for producing a plurality of loci of the ratios of said detector signals for determining the simultaneous locations of sources of radiation.

11. A radiation detection system as in claim 10 in which said detectors comprise first, second and third detectors to determine the simultaneous locations in two dimensions of said sources of radiation.

12. A radiation detection system as in claim 11 in which said first, second and third detectors are at known locations which define a plane; and said plane passes substantially through said sources of radiation.

13. A radiation detection system as in claim 11 in which said first, second and third detectors are mounted at three separate known locations; said known locations lie in a straight line; and the central axes of said first, second and third detectors are parallel.

14. A radiation detection system comprising a plurality of fixed position omnidirectional radiation intensity responsive detectors each responsive to radiation for producing a detector signal; and means including signal acquisition means and computer means connected to said detectors for producing a plurality of loci of the ratios of said detector signals for determining the simultaneous locations of sources of radiation; said detectors comprising one or more sets of three detectors each; each of said sets of detectors being located in a different area to be monitored; and said computer means selectively addressing the outputs of each of said detectors at the output of said signal acquisition means to determine the simultaneous locations of as many as three radiating sources in each of said areas.

15. A radiation detection system comprising first, second and third fixed position omnidirectional G-M tubes in one area; said first, second and third G-M tubes producing first, second and third pulse output signals in response to sources of radiation; and means including computer means connected to said G-M tubes for producing intersecting loci of signal ratios for each source of radiation from said first, second and third signals to determine the locations of as many as three of said sources of radiation in said area.

16. A radiation detection system comprising first, second and third fixed position omnidirectional G-M tubes in one area to provide output signals to indicate the relative intensities of sources of radiation; and means including computer means connected to said G-M tubes for producing signal ratio sets for each of said sources from said output signals to determine the simultaneous locations of as many as three of said sources of radiation in said area.

17. A radiation detection system comprising first, second, third and fourth fixed position omnidirectional radiation intensity responsive detector means for producing first, second, third and fourth detector signals respectively in response to sources of radiation; and computing means responsive to said first, second, third and fourth detector means for producing a signal ratio set for each source of radiation from said first, second, third and fourth detector means to determine the locations in three dimensions of said sources of radiation.

18. A radiation detection system comprising first, second, third and fourth fixed position omnidirectional radiation intensity responsive detectors located in one area; said first, second, third and fourth detectors responsive to sources of radiation for producing first, second, third and fourth detector signals; and means including computing means connected to said first, second, third and fourth detectors for producing at least three intersecting loci of the ratios of said signals for each of said sources of radiation from said first, second, third and fourth signals to determine the simultaneous locations in three dimensions of said sources of radiation in said area.

19. A radiation detection system as in claim 18 in which said first, second, third and fourth detectors are at known locations.

20. A radiation detection system as in claim 19 in which said first, second and third detectors lie in a straight line at three separate locations and said fourth detector is offset.

21. A radiation detection system comprising a plurality of fixed position omnidirectional radiation intensity responsive detectors each responsive to radiation for producing a detector signal; and means including signal acquisition means and computer means connected to said detectors for producing a plurality of loci of the ratios of said detector signals for determining the simultaneous locations of sources of radiation; said detectors comprising one or more sets of four detectors each; each of said sets of detectors being located in a different area to be monitored; and said computer means selectively addressing the outputs of each of said detectors at said signal acquisition means to determine the simultaneous locations of as many as four sources of radiation in each of said areas.

22. A radiation detection system comprising a first fixed omnidirectional radiation intensity responsive detector means without radiation attenuating shielding; a second directional radiation intensity responsive detector means; said first and second detector means responsive to radiation for producing first and second detector signals respectively; and means including computer means connected to said first and second detector means for producing a first locus of the ratio of said first and second detector signals and for producing a second locus from said second detector signal, said first and second locus intersecting for determining the location of a source of radiation in two dimensions.

23. A radiation detection system as in claim 22 characterized by said first locus being a circle and by said second locus being a straight line of directivity.

24. A radiation detection system comprising first and second fixed position omnidirectional radiation intensity responsive detector means without radiation attenuating shielding; a third directional radiation intensity responsive detector means; said first, second and third detector means responsive to radiation for producing first, second and third detector signals respectively; and means including computer means connected to said first, second and third detector means for producing a first locus of the ratio of said first and second detector signals, for producing a second locus of the ratio of said first and third detector signals and for producing a third locus from said third detector signal, said first, second and third locus intersecting for determining the location of a source of radiation in three dimensions.

25. A radiation detection system as in claim 24 characterized by said first and second loci being spheres and by said third locus being a plane of directivity.

26. A method for locating a source of radiation which comprises the steps of measuring the radiation intensities without radiation attenuating shielding at spaced known locations and combining the ratios of said radiation intensities and the point co-ordinates of said known locations to determine the location of said source.

27. A method for locating a source of broadband radiation in two dimensions which comprises the steps of measuring the radiation intensities without radiation attenuating shielding at first, second and third spaced known locations remote from said source; and deriving a first ratio and a second ratio of said radiation intensities and inserting said ratios and the two dimensional co-ordinates of said known locations in a set of point source equations to determine the location of said source.

28. A method for locating a source of broad-band radiation as in claim 27 which further comprises deriving a third ratio of said radiation intensities; determining all angles of intersections at the said source location of the loci defined by said first, second and third ratios; selecting two of said loci whose intersection with each other at said source location is a maximum; determining if said third ratio defines one of said selected loci; using the ratios which define two of said selected loci to redetermine the location more accurately of said source if said third ratio defines one of said selected loci.

29. A method for locating a source of broadband radiation in three dimensions which comprises the steps of measuring the radiation intensities directly at first, second, third and fourth spaced known locations remote from said source; and inserting the ratios of said radiation intensities and the three dimensional co-ordinates of said known locations in a set of point source equations to determine the location of said source.

30. A method for locating sources of radiation in space in one area, said sources having the characteristic of random locations; said method comprises the steps of periodically measuring the radiation intensities at known locations, computing a set of ratios of said radiation intensities, comparing the said set of ratios with the previously computed set of radiation intensity ratios to give the location of a new source of radiation when it first appears together with the location of any existing sources of radiation which have been previously located.

31. A method for locating sources of radiation in space in one area, said sources having the characteristic of random locations; said method comprises the steps of periodically measuring the radiation intensities at known locations, computing a set of ratios of said radiation intensities, comparing the said set of ratios with the previously computed set of radiation intensity ratios, comparing the said set of ratios and the said previously computed ratios to determine a set of differences; said set of differences being analyzed by an algorithm means to determine either that the said set of differences is due to a change in the size of any or all of said existing sources or that the said set of differences is due to the appearance of a new source of radiation and to give the location of said new source of radiation when it first appears together with the locations of any existing sources of radiation which have been previously located.

32. A method for locating sources of radiation in space in one area as in claim 30 which comprises either periodically sizing said existing sources of radiation by applying said algorithm means to solve for a plurality of multiplying factors in said multiple source equations, determining the existing radiation intensities produced by said sources to provide a periodic reference set of intensities for said locations and computing the sizes of said sources of radiation from said existing radiation intensities and the known source locations if said set of differences is due to a change in any or all of said existing sources or assigning the said set of differences as a new reference set for said location if said set of differences is due to said new source of radiation, assigning an initial value of unity for the multiplying factor of said new reference set and periodically sizing said existing sources of radiation and said new source of radiation by applying said algorithm means to solve for said plurality of multiplying factors in said multiple source equations.

33. A method for locating sources of radiation in space in one area as in claim 31 in which said algorithm means, being applied to solve a set of multiple source equations, correlates the said radiation intensities to the said existing sources.

34. A method for locating as many as four sources of radiation in a three dimensional space in one area, said sources having the characteristics of random locations and of wide range gamma energy emission levels; said method comprises the steps of periodically measuring the radiation intensities at four known locations, computing a set of three ratios of said radiation intensities, comparing the said set of three ratios with the previously computed set of three ratios of radiation intensities to give the location of any new source of radiation when it first appears together with the locations of said sources which have previously been located.

35. A method for locating as many as four sources of radiation in a three dimensional space in one area as in claim 34 in which locating said new source location further comprises computing a complete set of ratios by determining the remaining set of ratios from the remaining combinations of pairs of said radiation intensities at said known locations; determining the intersection angles at said source location of the loci of said complete set of ratios; selecting three of said loci whose intersection angle with each other at said location is a maximum and redetermining the source location more accurately if at least one of the said remaining sets of ratios defines one of said three selected loci.

36. A method for locating sources of radiation in space in one area, said sources having the characteristic of random locations; said method comprises the steps of periodically measuring the radiation intensities at known locations, computing a set of ratios of said radiation intensities, comparing the said set of ratios with the previously computed set of ratios of radiation intensity to establish the existence of a new source of radiation when it first appears, said new source of radiation being defined by a new ratio set, comparing the new ratio set with predetermined ratio sets in a lookup table provided for shadow areas, determining either the location of said new source of radiation if said new ratio set exists in said lookup table or the location of said new source of radiation by computing the location using the said new ratio set and said known locations if said new ratio set does not exist in said lookup table.

37. A method for locating a source of radiation said method comprises the steps of measuring the radiation intensities without radiation attenuating shielding at first, second, third and fourth known locations; determining a first ratio of intensities for said first and second known locations; determining a second ratio of intensities for said first and third known locations; determining a third ratio of intensities for said first and fourth known locations; and computing from the point co-ordinates of the said first, second, third and fourth known locations and the said first, second and third ratios the location in three dimensions of said source.

38. A method according to claim 37 wherein said step of computing includes the step of solving the point source equations of said point co-ordinates and said ratios.

39. A method for locating a source of radiation as in claim 37 which further comprises the steps of determining fourth, fifth and sixth ratios from the remaining combinations of pairs of radiation intensities of said first, second, third and fourth known locations; determining all intersection angles at said source location of the loci defined by said first, second, third, fourth, fifth and sixth ratios; selecting three of said loci whose intersection angle with each other at said source location is maximum; and redetermining the location more accurately of said source if at least one of said fourth, fifth or sixth ratio defines one of said three loci.

40. A method for sizing sources of radiation at known source locations, characterized by the initial intensity produced by each source at each of n detector locations being known, where n is any number equal to or greater than three; said method comprises the steps of periodically measuring the radiation intensities at said known detector locations; periodically computing a new multiplying factor for each of said sources by simultaneously solving a set of multiple source equations; computing the product of said new multiplying factors and the previously known radiation intensities to determine the existing radiation intensities produced by said sources and computing simultaneous sizes of said sources from the said existing radiation intensities and the said known source locations.

41. A method for sizing sources of radiation at known source locations as in claim 40 characterized by the number of said sources not exceeding n.

42. A method for verifying the existence of an unknown source of radiation amongst known sources of radiation at known locations which comprises the steps of measuring radiation intensities at n locations where n is any number equal to or great than three, said method characterized by said known locations of radiation not exceeding n-1 in number and by a set of multiple sources equations consisting of n equations in number; said method further comprises the steps of computing a first new set of multiplying factors for each of said known sources from a first partial set of multiple source equations, the number of equations of said first partial set being equal to the number of said known locations; computing a second new set of multiplying factors for each source from a second partial set of multiple source equations, the number of equations of said second partial set being equal to the number of said known locations; comparing the first new set of multiplying factors with the said second new set of multiplying factors; determining either the existence of said unknown source if said first new set of multiplying factors is different from said second new set of multiplying factors or the non-existence of said unknown source if said first new set of multiplying factors is equal to said second new set of multiplying factors.

43. A method for locating sources of radiation, said method comprises the steps of periodically measuring the radiation intensities at known locations, computing a set of ratios of said radiation, intensities, deriving current multiplying factors for existing sources, and determining either the values of said set of ratios and calculating current sizes of sources if the values of said set of ratios have remained constant or the current values of said set of ratios if said current values have changed; and verifying either that said current values being due to the latest sizes of said existing sources and calculating said latest sizes if only said latest sizes have changed or that said current values being also due to a new source, deriving a new ratio set for said new source and calculating said latest sizes if the rate of change of said latest sizes have remained constant; and searching either a lookup table for determining the location of said new source if said new ratio set exists in said lookup table or computing the location of said new source if said new ratio set does not exist in said lookup table.

44. A method for locating sources of radiation as in claim 43 which further comprises the steps of searching the ratio set data in said lookup table for n source energy levels, where n is any value equal to or greater than one.

45. A radiation detection system comprising omnidirectional broad-band radiation intensity responsive detectors at spaced known locations without radiation attenuating shielding, said detectors each responsive to radiation for producing a detector signal; means connected to said detectors and responsive to said detector signals for producing ratios of the intensities of said detector signals and means combining said ratios and the point co-ordinates of said known locations for determining the location of a source of radiation.

46. A radiation detection system comprising first, second and third omnidirectional radiation intensity responsive detectors without radiation attenuating shielding at known spaced locations; said first, second and third detectors each responsive to radiation for producing a detector signal; means connected to said first, second and third detectors and responsive to said detector signals for producing ratios of the intensities of said detector signals and means combining said ratios and the point co-ordinates of said known locations for determining the location of a source of radiation.

47. A radiation detection system comprising first, second, third and fourth omnidirectional radiation intensity responsive detectors without radiation attenuating shielding at known spaced locations, said first, second, third and fourth detectors each responsive to radiation for producing detector signals; means connected to said first, second, third and fourth detectors and responsive to said detector signals for producing ratios of the intensities of said detector signals and means for inserting said ratios and the three dimensional point co-ordinates of said known locations in point source equations for determining the location of a source of radiation.

48. A radiation detection system comprising omnidirectional radiation intensity responsive detectors at known locations, said detectors each responsive to radiation for producing a detector signal; means connected to said detectors and responsive to said detector signals for periodically measuring the intensities of said detector signals at said known locations; means for computing a set of ratios of said detector signals; means for comparing the said set of ratios with the previously computed set of detector signal ratios; means to derive the location of a new random source of radiation after the appearance of said new random source from the comparison of said set of ratios and said previously computed set of ratios and means to provide the location of any existing sources of radiation previously located.

49. A radiation detection system comprising omnidirectional broad-band radiation intensity responsive detector means without radiation attenuating shielding and means producing intersecting loci of signal ratios responsive to said detector means for determining the location of a source of radiation of unknown size.

50. A radiation detection system comprising fixed position omnidirectional broad-band radiation intensity responsive detector means without radiation attenuating shielding and computer means responsive to said detector means for determining the locations of sources of radiation.

51. A radiation detection system comprising a plurality of omnidirectional broad-band radiation intensity responsive detectors without radiation attenuating shielding, each of said detectors being at a known location and responsive to radiation for producing a detector signal; and means including computer means connected to said detectors for producing a plurality of intersecting loci of the ratios of said detector signals for determining the simultaneous locations of sources of radiation.

52. A radiation detection system comprising first, second and third omnidirectional radiation intensity responsive detectors each at a known location; said first, second and third detectors upon receipt of radiation producing first, second and third outputs respectively; means including computer means connected to said first, second and third detectors and responsive to said first, second and third outputs respectively for producing a first circle from the ratio of said first output and said second output and for producing a second circle from the ratio of said first output and said third output; and means for deriving the points of intersection of said first and second circles to determine the location of a source of radiation.

53. A radiation detection system comprising n omnidirectional radiation intensity responsive detectors each at a known location where n is any number equal to or greater than three; each detector producing an output upon receipt of radiation by such detector; means including computer means connected to said detectors and responsive to said n outputs for producing a first locus from the ratio of said first output and said second output up to an $(n-1)$th locus from the ratio of said $(n-1)$th output and said nth output; and means for deriving the points of intersection of said $(n-1)$ loci to determine the location of a source of radiation.

54. A radiation detection system as in claim 53 in which said computer means consists of means correlating the component parts of the total outputs from each of said n detectors in response to sources of radiation to the signal intensity at each of said first to nth detectors respectively due to each source at a known location to determine the locations of each of said sources, characterized by said known locations not exceeding n in number.

55. A radiation detection system as in claim 51 in which said computer means consists of means deriving differential detector outputs due to an unknown source, and means for deriving the points of intersection of new loci from said differential detector outputs to determine the location of said unknown source.

* * * * *

UNITED STATES PATENT AND TRADEMARK OFFICE
CERTIFICATE OF CORRECTION

PATENT NO. : 4,172,226
DATED : Oct. 23, 1979
INVENTOR(S) : Saul Rubin

It is certified that error appears in the above-identified patent and that said Letters Patent are hereby corrected as shown below:

In the Drawings:

Sheet 3, Fig. 9, change the location of the lead line for "62" so that the lead line leads to the center of the circle 70.

Sheet 3, Fig. 10, change the location of the lead line for "67" so that the lead line leads to the center of the circle 68.

In the Description

Column 15, line 57, "arrangement" should read -- agreement --.

Column 18, line 6, "circuits" should read -- circuit --.

Column 16, line 29, "Pg.33" should read -- Col. 15, line 44 --.

Column 19, line 34, "Page 36" should read -- Col. 16, line 53 --.

UNITED STATES PATENT AND TRADEMARK OFFICE
CERTIFICATE OF CORRECTION

PATENT NO. : 4,172,226

DATED : Oct. 23, 1979

INVENTOR(S) : Saul Rubin

It is certified that error appears in the above-identified patent and that said Letters Patent are hereby corrected as shown below:

Claim 32, line 2, "30" should read -- 33 --.

Claim 55, line 1, "51" should read -- 53 --.

Signed and Sealed this

Eighth Day of April 1980

[SEAL]

Attest:

SIDNEY A. DIAMOND

Attesting Officer

Commissioner of Patents and Trademarks

Disclaimer 4,172,226.—*Saul Rubin*, Toronto, Canada. REMOTE RADIATION DETECTION SYSTEM. Patent dated Oct. 23, 1979. Disclaimer filed Sept. 22, 1982, by the inventor.

Hereby enters this disclaimer to claim 1 of said patent.

[*Official Gazette November 16, 1982.*]